Nov. 26, 1968          J. R. SMITH, JR          3,412,729
METHOD AND APPARATUS FOR CONTINUOUSLY MONITORING
BLOOD OXYGENATION, BLOOD PRESSURE, PULSE RATE
AND THE PRESSURE PULSE CURVE UTILIZING
AN EAR OXIMETER AS TRANSDUCER
Filed Aug. 30, 1965
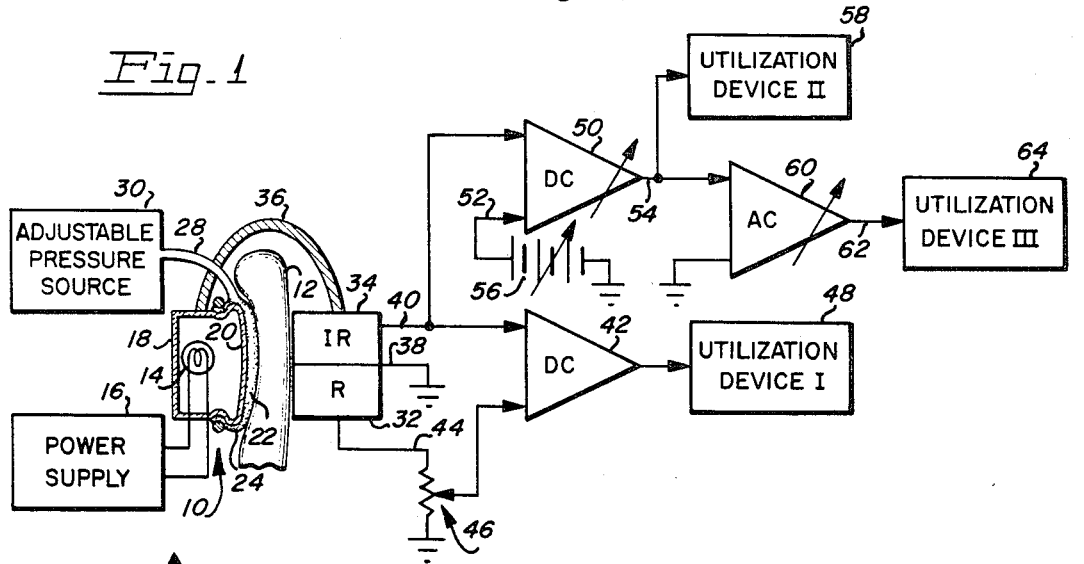
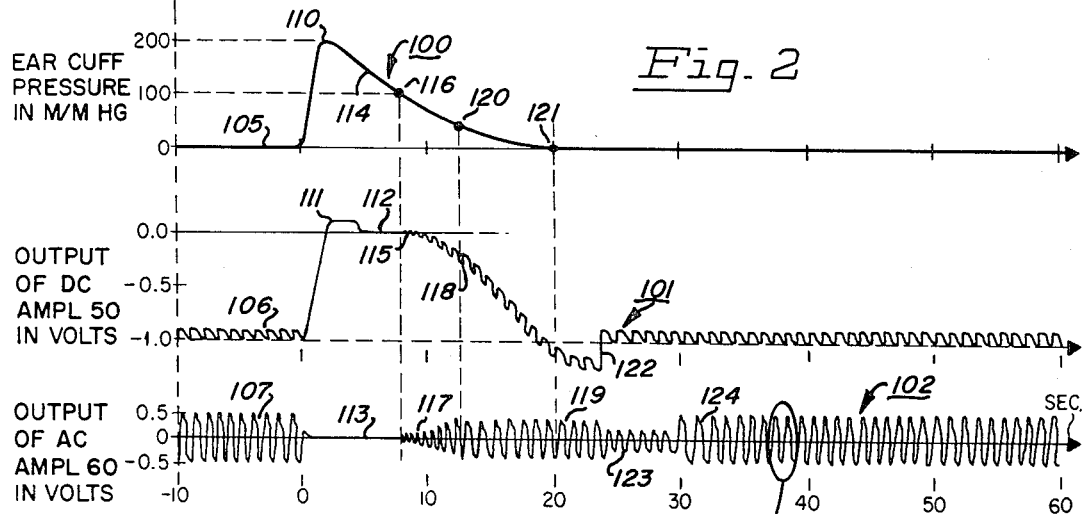
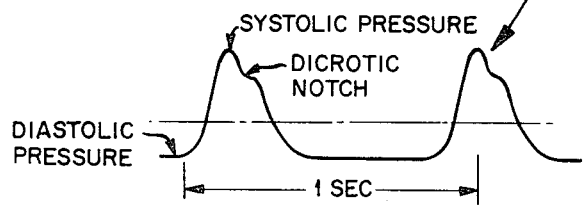
INVENTOR.
JOSEPH R. SMITH, JR.
ATTORNEYS United States Patent Office 3,412,729
Patented Nov. 26, 1968

3,412,729
METHOD AND APPARATUS FOR CONTINUOUSLY MONITORING BLOOD OXYGENATION, BLOOD PRESSURE, PULSE RATE AND THE PRESSURE PULSE CURVE UTILIZING AN EAR OXIMETER AS TRANSDUCER
Joseph R. Smith, Jr., Milpitas, Calif., assignor to the United States of America as represented by the Administrator of the National Aeronautics and Space Administration
Filed Aug. 30, 1965, Ser. No. 483,885
5 Claims. (Cl. 128—2.05)

ABSTRACT OF THE DISCLOSURE

An apparatus and method for continuously monitoring the blood oxygen saturation, blood pressure, pulse rate and the pressure pulse curve of a subject. An ear oximeter is used to provide arterial blood oxygen saturation. The output from the infrared photocell of the oximeter is also applied to a variable gain D-C amplifier of the differential type which develops an output signal commensurate with blood pressure. The blood pressure signal is applied to a variable gain A-C amplifier which blocks the D-C component and suitably amplifies the A-C component of the blood pressure signal to develop the pressure pulse signal. The inputs to the amplifiers and the gains of the amplifiers are adjusted so that the systolic and diastolic pressures can be obtained.

---

The invention described herein may be manufactured and used by or for the Government of the United States of America for governmental purposes without the payment of any royalties thereon or therefor.

This invention relates to a method and apparatus for continuously monitoring the blood oxygenation, blood pressure, pulse rate and pressure pulse curve of a subject under test utilizing an ear oximeter as the transducer, and more particularly to an apparatus and a method for utilizing and calibrating the output signal from the infra-red photocell of an ear oximeter to provide a continuous record of the in vivo blood pressure, pulse rate and pressure pulse curve of the test subject.

With the advent of placing persons into an environment which is basically foreign to them, such as for example, a pilot in a high speed aircraft or an astronaut in a space capsule or the like, it has become increasingly important to measure the "well-being" of the persons so exposed. The term "well-being," as herein used, refers to certain of his physiological conditions, namely those which are indicative of the person's ability to properly function, make proper decisions, continue to assume responsibility under high stress situations, and to perform certain tasks such as operate the vehicle.

Blood pressure, blood oxygenation, pulse rate and the pressure pulse curve are important physiological factors which have been found to provide important data in connection with the determination of the degree of well-being of a subject. Arterial oxygen saturation measurements not only determine the amount of oxygen present in the subject's environment, but also the breathing condition of the subject. Blood pressure measurements, such as the systolic pressure which occurs during the systole, the diastolic pressure which occurs during the diastole, and the period and rate of change of the pressure changes are indicative of the subject's circulation system.

Heretofore, blood oxygen saturation has been determined by the use of an ear oximeter which can be worn by a pilot, or a person, similarly engaged, without appreciable discomfort and which requires little space and instrumentation for deriving the saturation.

The ear oximeter is a well-known instrument and is described in United States Letters Patent 2,706,927 which issued on Apr. 26, 1955, to Earl H. Wood. Briefly, it measures the light absorbed by the hemoglobin in the blood of the ear lobe at two different light frequencies (red and infra-red). Then, by appropriate combination of these two measurements, it gives a direct measure of the percent saturation of the blood since the absorption of the red light is independent of the blood oxygen and may be used to factor out the blood volume. This device has proved in the past to be of great clinical value in studying blood oxygenation in patients under anesthesia, patients who have considerable respiratory paralysis, and patients who have other types of poor blood oxygenation.

The ear oximeter includes a source of heat which heats the ear to such an extent that the arterioles dilate greatly. As a result, the blood flow through the ear becomes so rapid that very little deoxygenation occurs in the capillaries. Consequently, the ear oximeter measures essentially the arterial oxygen saturation, which in most instances is much more important than measurement of oxygen saturation in the venous blood. The ear oximeter also includes a pressure capsule which is utilized to pressurize the ear lobe until the arteries or veins are compressed to entirely stop the circulation of any blood for initial calibration. When blood circulation is stopped, the amount of light absorbed at the two different frequencies, as determined by photoelectric cells, is equalized to factor out blood volume.

Blood pressure, pulse rate and the pressure pulse curve were heretofore determined respectively by the use of the arm cuff, the electrocardiograph and the arterial catheter. While these devices perform the desired measurements, they are cumbersome, require a skilled attendant and therefore are unsuited for continuously monitoring the physiological condition of a test subject in an aircraft, test capsule or in a simulated environment such as a centrifuge.

To overcome this limitation it has been suggested to utilize the absorption of infra-red light by the blood as a transducer for measuring instantaneous blood volume and thereby blood pressure. More particularly, Wood et al., in Measurement of Blood Content and Arterial Pressure in the Human Ear, Proc. Staff Meet, Mayo Clin., 25, 398–405, July 5, 1960, describes a device, similar to the ear oximeter but without the red light and red photoelectric cell, which is inflated to stop circulation. Thereafter, the pressure capsule is slowly deflated and the inflation pressure at the appearance of the first pulse in the photocell output signal is taken as the systolic pressure. The inflation pressure at which the ear pulse obtained maximum amplitude was taken as the diastolic pressure.

The problem with this method is that it does not provide a continuously monitorable blood pressure, each new determination required the inflation and deflation of the pressure capsule and the measurement of the capsule pressure. Further, it lacked information as to the pulse rate and the pressure pulse curve.

It is therefore a primary object of this invention to provide an apparatus and method for continuously monitoring the blood oxygen saturation, blood pressure and pulse rate and the pressure pulse curve of a subject under test.

It is a further object of this invention to utilize the infra-red light absorption of tissue to provide a continuously determination of the blood pressure, pulse rate and the pressure pulse curve of a subject under test.

It is another object of this invention to utilize an ear oximeter as the transducer element to provide a continuous measurement of the blood oxygen saturation, the blood pressure, the pulse rate and the pressure pulse curve of a subject under test.

It is another object of this invention to provide a new use for an ear oximeter, commonly used for measuring blood oxygen saturation, by which the blood pressure, pulse rate and pressure pulse curve of the test subject are continuously monitored and recorded in addition to the oxygen saturation.

It is also an object of this invention to provide improved instrumentation for determining certain physiological data of a test subject.

It is a further object of this invention to provide a method of calibrating the electrical output signal from the infra-red photocell of an ear oximeter to provide direct reading of the blood pressure, systolic and diastolic, of a test subject.

It is a still further object of this invention to provide instrumentation by which the electrical signal of the infra-red photocell of an ear oximeter may be utilized to continuously provide the blood pressure, the pulse rate and the pressure pulse curve of a test subject.

Briefly, the present invention accomplishes the stated objects by utilizing an ear oximeter to provide arterial blood oxygen saturation in the usual manner, that is by utilizing the output signals developed by a red photocell and an infra-red photocell and applying them differentially to an amplifier which provides an output signal commensurate with their difference. The output signal from the infra-red photocell is also applied to a variable gain direct-current amplifier, which may be of the differential type, which has applied thereto an adjustable reference voltage and which develops an output signal commensurate with the difference between the photocell output signal and the reference voltage. This signal is commensurate with the blood pressure and is also termed the blood pressure signal. The blood pressure signal is applied to a variable gain alternating-current amplifier which blocks the direct-current component and suitably amplifies the alternating-current component of the blood pressure pulse signal.

The adjustable reference voltage and the gains of the direct-current and the alternating-current amplifiers are carefully adjusted so that the amplitude of the blood pressure signal corresponds directly to the systolic pressure, and the amplitude of the pressure pulse signal corresponds directly to the difference between the systolic and diastolic pressures. By subtracting the pressure derived from the pressure pulse signal from the pressure derived from the blood pressure signal, the diastolic pressure is obtained. Further, the pressure pulse signal, being continuous, provides the pulse rate and the other information normally available from the pressure pulse curve.

Further objects and advantages of the present invention will become apparent to those skilled in the art to which the invention pertains as the ensuing description proceeds.

The features of novelty that are considered characteristic of this invention are set forth with particularity in the appended claims. The organization and method of operation of the invention itself will best be understood from the following description when read in connection with the accompanying drawings in which:

FIGURE 1 is a schematic diagram, partially in block form, showing the apparatus for practicing the present invention;

FIGURE 2 shows three curves which respectively depict the ear cuff pressure, the blood pressure signal and the pressure pulse signal, on a common time scale, and which are useful in explaining the method of calibrating the apparatus of FIGURE 1; and FIGURE 3 is an enlarged portion of two cycles of the pressure pulse signal taken from the encircled portion in FIGURE 2.

Referring now to the drawings and preliminarily to FIGURE 1 thereof, there is shown, in schematic form, an ear oximeter ear piece 10 clamped upon the upper portion of an ear 12. Ear oximeter ear piece 10 includes a source of illumination such as light bulb 14 which is connected to a suitable power supply 16 which typically provides 6 volts at 0.2 amperes. Lamp 14 also furnishes the heat for dilating the arterioles in the ear tissue. Light bulb 14 is supported within a housing 18 which has a transparent end face 20. Transparent end face forms one side of a pressure capsule 22, the remainder of which may comprise a translucent rubber diaphragm 24 which is clamped to housing 18 by means of a retaining ring 26.

Pressure capsule 22 is pressurized through a hose connection 28 which communicates the interior of pressure capsule 22 with an adjustable pressurizing source 30. On the other side of ear 12, and in a position to receive the light transmitted by the ear, there is positioned a red photocell 32 and an infra-red photocell 34, shown only in schematic outline. The photocells (or their housing which is not shown) are physically connected to housing 18 by a connecting member such as bracket 36 to provide a clamping effect against which the diaphragm pressure may operate.

Photoelectric cells 32 and 34 have one of their output terminals connected to a common reference potential, such as ground, as indicated by lead 38. The other output terminal of cell 34 is connected, via lead 40, to one of the input terminals of a direct-current difference amplifier 42, and the outher output terminal of cell 32 is connected, via lead 44, and an adjustable gain control means generally indicated at 46, to the other input terminal of amplifier 42. Gain control means 46 is utilized for calibration purposes and is adjusted to make the output signal, also termed the blood oxygen saturation signal, from amplifier 42 equal to a predetermined reference level when pressure capsule 22 is pressurized sufficiently to prevent any blood circulation through the clamped portion of ear 12. The gain of amplifier 42 is adjusted to calibrate the output signal of amplifier 42 in accordance with normal practices. The blood oxygen saturation signal is applied to a utilization device 48 which commonly is, but need not be, one of the recording tracks of a multi-channel pen recorder.

Lead 40 is also connected to the input terminal of an adjustable gain, direct-current amplifier 50 which has also applied thereto an adjustable bucking voltage along a lead 52. Amplifier 50 is in the nature of a difference amplifier and provides an output signal, along an output lead 54, which is proportional to the difference between the signal from photocell 34 and the bucking voltage supplied by adjustable voltage source 56. One terminal of voltage source 56 is connected to lead 52 and the other terminal is grounded.

The output signal from amplifier 50, which is the blood pressure signal, is applied to a utilization device 58 which may be another track of the multi-channel pen recorder already mentioned. The blood pressure signal is also applied to an adjustable gain alternating-current amplifier 60 which develops the pressure wave signal. The output of amplifier 60 is connected, via lead 62, to a utilization device 64 which may be another track of the multi-channel pen recorder already mentioned. It is to be understood that utilization devices 48, 58 and 64 may take other forms, such as for example, transmitters by which the saturation signal, the blood pressure signal and the pressure wave signal may be transmitted over long distances to a processing station.

The operation of this invention is best understood by reference to the three graphs depicted in FIGURE 2 and the fact that infra-red photocell 34 provides an output signal which is directly proportional to blood volume and independent of blood oxygen saturation. Typically, infra-red cell 34 is responsive to light having a wave length of about 790 millimicrons whereas red photocell 32 is typically responsive to light having a wave length of 640 millimicrons. The apparatus and method utilized in connection with obtaining the arterial blood oxygen saturation of a person under test, i.e., the blood saturation signal, is well-known to those skilled in the art, and forms no part of this invention except insofar as it is utilized in combination with the remaining portion of the apparatus shown in FIGURE 1.

Generally speaking, the signal from infra-red cell 34 varies inversely with blood volume which in turn varies directly with blood pressure. The output signal from cell 34 is therefore minimum when the blood pulse pressure is a maximum which corresponds to the systolic pressure when no ear cuff pressure is applied to the ear tissue, and vice versa. The reason for this is, of course, that as the blood volume is a maximum, a maximum amount of blood is forced through the tissue being investigated and a maximum amount of light absorption takes place. The greater the absorption, the less light is transmitted to the photocell and, accordingly, the smaller is the photocell output signal.

Referring now to FIGURE 2, there are shown three curves respectively identified as curves 100, 101 and 102. All curves are plotted on a common time scale along the abscissa. Curve 100 is termed the ear cuff pressure and represents the instantaneous pressure in pressure capsule 22 in millimeters of Hg. Curve 101 is the blood pressure signal obtained from amplifier 50 in volts. Curve 102 is the pressure wave signal obtained from amplifier 60 in volts.

When the ear cuff pressure is zero, as represented by portion 105 of curve 100, the amplitude of the blood pressure signal is a minimum, as shown by portion 106 of curve 101, and represents the systolic blood pressure to some convenient scale. As here shown, the blood pressure signal is about −1 volt and comprises a direct-current component and an alternating-current component. At zero ear cuff pressure the amplitude of the blood pressure pulse signal is a maximum, as shown by portion 107 of curve 102, and represents the difference between the systolic and the diastolic blood pressure. Of course, portion 107 is the alternating-current component of portion 106 of the blood pressure signal. After proper calibration, therefore, both the systolic pressure and the difference between the systolic and diastolic pressure may be directly read from the curves 101 and 102 respectively as recorded by utilization devices 58 and 64.

The method utilized to calibrate the device of this invention, that is, adjusting the gains of amplifiers 50 and 60 and of voltage source 56, is as follows. Pressure capsule 22 is pressurized to about 200 millimeters of Hg as shown by portion 110 on curve 100. This pressure is sufficiently high to cut off all circulation through the ear tissue under the pressure applied by capsule 22 so that no blood flows therethrough, and there is no absorption of the light due to blood. Accordingly, the blood pressure signal may now be adjusted to a suitable "zero" adjust, such as 0 volts. Portion 111 of curve 101 shows the output voltage of amplifier 50 before zero adjust is made. Zero adjust is made by adjusting voltage source 56 until the blood pressure signal amplitude on lead 54 is zero volts (or some other convenient reference potential) as illustrated by portion 112 of curve 101. The zero adjust level of the blood pressure signal, therefore, is indicative of the absence of any blood. Of course, during the absence of blood flow, there is no pulse pressure signal as shown by portion 113 of curve 102.

The ear cuff pressure is then allowed to bleed off slowly as indicated by portion 114 of curve 100. As the ear cuff pressure becomes equal to the systolic pressure, some blood circulation commences which is noted by a decrease in the blood pressure signal as indicated by point 115 of curve 101 and the appearance of some pressure pulses. The ear cuff pressure corresponding to point 115 is carefully noted, as shown by point 116 on curve 100 since it is the systolic pressure of the subject under test. At the same time a pressure pulse signal is obtained as shown by portion 117 of curve 102.

As the ear cuff pressure continues to decrease, the blood pressure signal likewise continues to decrease, as shown by portion 118, indicating increasing absorption of light. At the same time the amplitude of the pressure pulse signal continues to increase showing that more and more of the applied pressure pulse passes through the illuminated tissue.

As soon as the ear cuff pressure becomes equal to the diastolic pressure, the total amplitude of the pressure pulse is utilized to pump blood through the tissue and the amplitude of the pressure pulse signal becomes constant as shown by portion 119 of curve 102. The point in time at which portion 119 commences is noted and the ear cuff pressure at that time is determined, as shown by point 120. This is the diastolic pressure.

In the illustrated curves the systolic pressure was found to be 100 millimeters of Hg and the diastolic pressure was found to be 60 millimeters of Hg. After the ear cuff pressure has been allowed to bleed off completely, as shown by point 121, or soon thereafter, the gain of amplifier 50 may be adjusted in accordance with some convenient scale. For example, as shown at 122, the gain of DC amplifier 50 is decreased so that the blood pressure signal becomes −1.0 volt. Since it is known that the systolic pressure is equal to 100 millimeters of Hg and since the voltage level has changed by 1 volt, the apparatus is now calibrated so that 1 millimeter of Hg corresponds to 0.01 volt. Accordingly, the systolic pressure may now be read directly from graph 101 in a continuous manner.

As the gain of the amplifier is decreased, as shown at 122, a corresponding change in amplitude of the pulse pressure signal is noted, as illustrated by portion 123 of graph 102. However, the gain of amplifier 60 is now adjusted so that the difference between the systolic and the diastolic pressure corresponds to a known number of millimeters of Hg. For example, as shown at 124, the gain of amplifier 60 is increased so that 1 volt corresponds to the difference between the systolic and diastolic pressure as previously determined by the ear cuff pressure, i.e., 40 millimeters of Hg and 1 millimeter of Hg correspond to 0.025 volt. Accordingly, the difference between the systolic and the diastolic pressure may now be read from graph 102 in a continuous manner. Additionally, the pressure curve signal provided on a time scale affords a ready means of determining the pulse rate.

FIGURE 3 illustrates two cycles of the pressure pulse signal magnified several times. This curve provides information of the efficiency of pumping and other physiological data useful in assessing the "well-being" of the test subject.

There has been described an apparatus and a method which provide continuous measurement of the oxygen saturation, blood pressure, pulse rate and the pressure pulse curve of a subject under test. The device utilizes a single ear oximeter as transducer element and a diaphragm pressurizing source. The device can be worn by a test subject with very little discomfort and affords an opportunity to conduct many physiological measurements with a simplicity heretofore not possible.

While the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention. It is the intention, therefore, to be limited only as indicated by the scope of the following claims.

What is claimed is:

1. The method of continuously monitoring the blood pressure, pressure wave and pulse rate of a subject under test and having an ear oximeter clamped to his ear, said method comprising the steps of:

applying maximum ear cuff pressure to the ear which is in excess of the subject's systolic pressure;

developing a bucking signal of selected amplitude and polarity;

adding the output signal from the infra-red photosensitive cell of the ear oximeter and the bucking signal to develop a first signal;

applying the first signal to an adjustable gain direct-current amplifier to provide a blood pressure signal;

applying the blood pressure signal to an adjustable gain alternating amplifier to develop a pressure wave signal;

relieving the ear cuff pressure and determining a first ear cuff pressure which corresponds to the pressure at which the blood pressure signal commences decreasing in amplitude and a second ear cuff pressure which corresponds to the pressure at which the pressure wave signal commences to be constant in amplitude;

adjusting the gain of the direct-current amplifier so that the decrease in amplitude of the blood pressure signal, after the ear cuff pressure becomes zero from said first signal, becomes equal to a selected amplitude in accordance with the first ear cuff pressure;

adjusting the gain of the alternating-current amplifier so that the amplitude of the pressure pulse signal, after the ear cuff pressure becomes zero, becomes equal to a selected amplitude in accordance with the second ear cuff pressure; and continuously recording the blood pressure signal and the pressure wave signal, whereby a continuous record of the systolic pressure, the difference between the systolic and diastolic pressure, the pulse rate and the pressure wave is obtained.

2. The method of continuously monitoring the blood pressure, pressure wave and pulse rate of a test subject which has an ear oximeter clamped to his ear, said method comprising the steps of:

applying maximum ear cuff pressure to the ear which is in excess of the subject's systolic pressure;

developing a bucking signal which is of the same amplitude and of opposite polarity to the signal developed by the infra-red photo-sensitive cell of the ear oximeter when maximum ear cuff pressure is applied;

adding the cell signal and the bucking signal to develop a first signal;

applying the first signal to an adjustable gain direct-current amplifier to provide a blood pressure signal;

applying the blood pressure signal to an adjustable gain alternating amplifier to develop a pressure wave signal;

relieving the ear cuff pressure and determining a first ear cuff pressure which corresponds to the pressure at which the blood pressure signal commences decreasing in amplitude and a second ear cuff pressure which corresponds to the pressure at which the pressure wave signal commences to be constant in amplitude;

adjusting the gain of the direct-current amplifier so that the amplitude of the blood pressure signal, after the ear cuff pressure becomes zero, becomes equal to a selected amplitude in accordance with the first ear cuff pressure;

adjusting the gain of the alternating-current amplifier so that the amplitude of the pressure pulse signal, after the ear cuff pressure becomes zero, becomes equal to a selected amplitude in accordance with the second ear cuff pressure; and continuously recording the blood pressure signal and the pressure wave signal, whereby a continuous record of the systolic pressure, the difference between the systolic and diastolic pressure, the pulse rate and the pressure wave is obtained.

3. An apparatus for continuously monitoring the blood oxygen saturation, blood pressure, pulse rate and pressure pulse curve of a test subject comprising:

an ear oximeter including first and second photo-responsive cells, responsive respectively to red light and infrared light and respectively providing first and second signals;

means responsive to said first and second signals and operative to develop a blood oxygen saturation signal which is proportional to the difference between said first and second signals and represent the blood oxygen saturation of the test subject to a selected scale;

means for developing a bucking signal of selected amplitude;

direct-current amplifier means responsive to said second signal and said bucking signal and operative to develop a blood pressure signal which is proportional to the difference between said second signal and said bucking signal;

alternating-current amplifier means responsive to said second signal to develop a pressure pulse signal; and recorder means for recording said blood saturation signal, blood pressure signal and said pressure pulse signal.

4. An apparatus in accordance with claim 3 in which said direct-current amplifier and said alternating-current amplifier each include adjustable gain control means.

5. An apparatus for continuously monitoring the blood oxygen saturation, blood pressure, pulse rate and pressure pulse curve of a test subject comprising:

an ear oximeter including first and second photo-responsive cells, responsive respectively to red light and infrared light and respectively providing first and second signals;

means responsive to said first and second signals and operative to develop a blood oxygen saturation signal which is proportional to the difference between said first and second signals and represent the blood oxygen saturation of the test subject to a selected scale;

means for developing a bucking signal of selected amplitude;

direct-current amplifier means, including adjustable gain control means, responsive to said second signal and said bucking signal and operative to develop a blood pressure signal which is proportional to the difference between the second signal and said bucking signal;

alternating-current amplifier means, including adjustable gain control means, responsive to said blood pressure signal to develop a pressure pulse signal; and recorder means for recording said blood saturation signal, blood pressure signal and said pressure pulse signal.

References Cited

UNITED STATES PATENTS

| | | | |
|---|---|---|---|
| 2,944,542 | 7/1960 | Barnett et al. | 128—2.05 |
| 3,051,165 | 8/1962 | Kompelien | 128—2.05 |
| 3,228,391 | 1/1966 | Fitter et al. | 128—2.05 |
| 3,347,222 | 10/1967 | Kohrer | 128—2 |

RICHARD A. GAUDET, *Primary Examiner.*

SIMON BRODER, *Assistant Examiner.*